US006427646B2

(12) United States Patent
Galka et al.

(10) Patent No.: US 6,427,646 B2
(45) Date of Patent: Aug. 6, 2002

(54) SMALL ENGINE FUEL INJECTION SYSTEM

(75) Inventors: William E. Galka, Caro; Anthony M. Kueffner, Frankenmuth; Dale P. Kus, Cass City; Kevin L. Williams, Columbiaville, all of MI (US)

(73) Assignee: Walbro Corporation, Cass City, MI (US)

( * ) Notice: Subject to any disclaimer, the term of this patent is extended or adjusted under 35 U.S.C. 154(b) by 8 days.

(21) Appl. No.: 09/764,701

(22) Filed: Jan. 18, 2001

Related U.S. Application Data

(60) Provisional application No. 60/178,429, filed on Jan. 27, 2000.

(51) Int. Cl.$^7$ .............................................. F02B 33/04
(52) U.S. Cl. ................................. 123/73 C; 123/73 B
(58) Field of Search ............................ 123/73 C, 73 B, 123/73 PP, 73 R

(56) References Cited

U.S. PATENT DOCUMENTS

| | | | | |
|---|---|---|---|---|
| 4,469,054 A | * | 9/1984 | Onishi et al. .............. | 123/73 R |
| 4,625,688 A | * | 12/1986 | Takayasu ................... | 123/73 B |
| 5,031,590 A | * | 7/1991 | Sakurai ..................... | 123/73 R |
| 5,586,525 A | * | 12/1996 | Masse ....................... | 123/73 B |
| 6,079,379 A | * | 6/2000 | Cobb, Jr. ................... | 123/73 B |
| 6,273,037 B1 | * | 8/2001 | Cobb, Jr. ................... | 123/73 B |
| 6,293,235 B1 | * | 9/2001 | Cobb, Jr. ................... | 123/73 B |
| 6,295,957 B1 | * | 10/2001 | Cobb, Jr. ................... | 123/73 B |

OTHER PUBLICATIONS

John Deere Consumer Products—Two–Stroke Engine Technology Overview—Feb. 1999, pp. 1–7.
Deere Technology Breakthrough Reduces Small Engine Emissions, John Deere Website Feb. 4, 1999, pp. 1–2.
Basic Design of Two–Stroke Engines, Gordon P. Blair, Chapter 7, p. 333.

* cited by examiner

Primary Examiner—Carl S. Miller
Assistant Examiner—Jason Benton
(74) Attorney, Agent, or Firm—Reising, Ethington, Barnes, Kisselle, Learman & McCulloch, P.C.

(57) ABSTRACT

A fuel injection system for a two-stroke small engine has a charge forming device with an injector mixing passage which forms a rich fuel and air mixture supplied to a tuned injector tube connected adjacent one end through a port to the engine cylinder and adjacent the other end to the engine crankcase. The charge forming device has a high speed fuel circuit which supplies at least a majority of the fuel to the mixing passage under wide open throttle operating conditions and preferably a minor portion of the fuel is also supplied by an idle fuel circuit which under engine idle conditions preferably supplies essentially all of the fuel to the engine. A separate inlet air flow passage of the charge forming device also supplies primarily air to the crankcase of the engine for transfer to the cylinder. Under engine wide open throttle conditions, preferably a very minor quantity of fuel with oil therein is supplied through the inlet air flow passage to the crankcase and transferred to the cylinder to provide lubrication of the moving parts in the crankcase and some cooling of the engine.

72 Claims, 6 Drawing Sheets

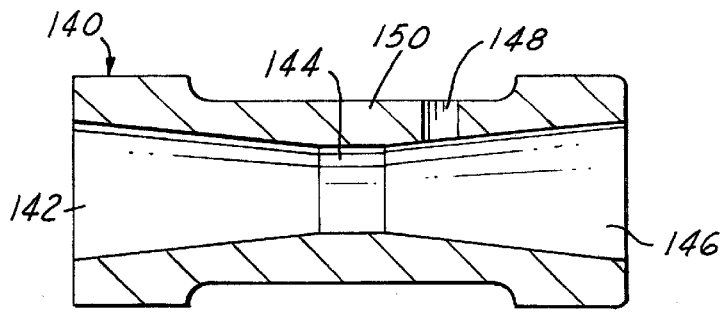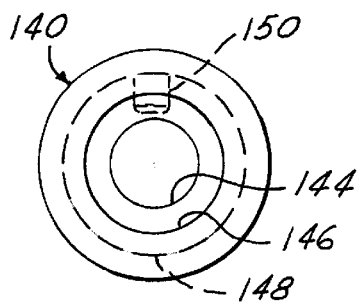
FIG.10   FIG.11
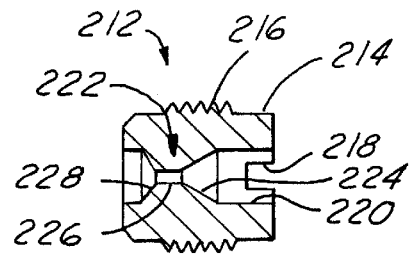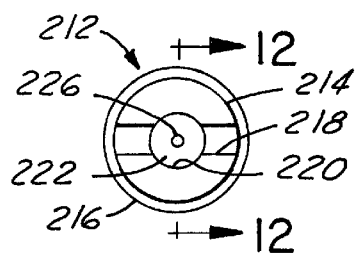
FIG.12   FIG.13
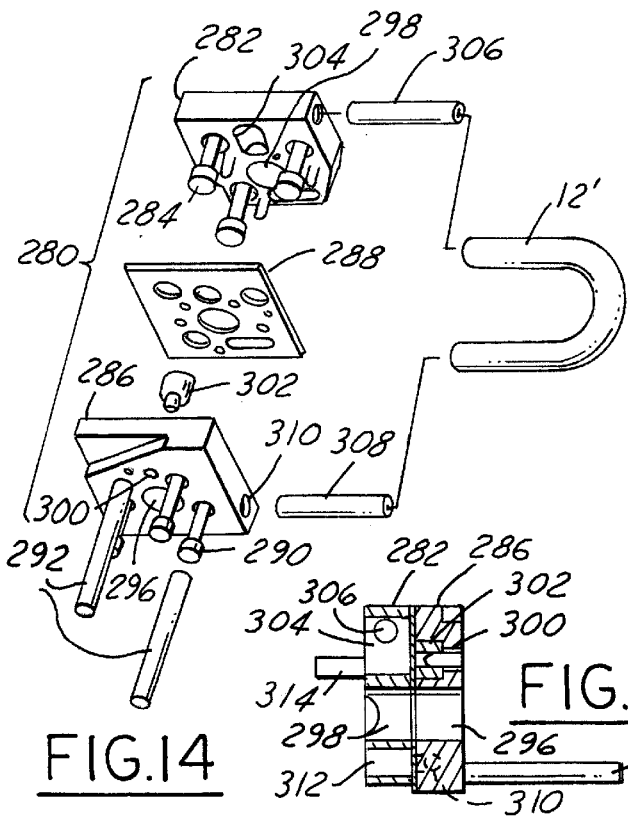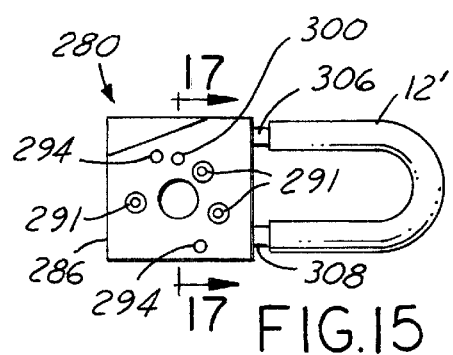
FIG.15
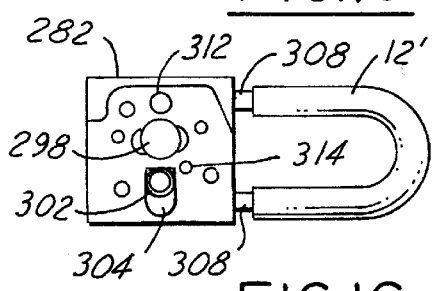
FIG.14   FIG.17   FIG.16

SMALL ENGINE FUEL INJECTION SYSTEM

REFERENCE TO CO-PENDING APPLICATION

This application claims the benefit of U.S. Provisional Patent Application Ser. No. 60/178,429 filed on Jan. 27, 2000.

FIELD OF THE INVENTION

This invention relates to fuel systems for engines and more particularly to a fuel injection system for small internal combustion engines.

BACKGROUND OF THE INVENTION

Typically, carburetors have been used to supply a fuel and air mixture to both four-stroke and two-stroke small internal combustion engines. For many applications where small two-stroke engines are utilized such as handheld power chain saws, weed trimmers, leaf blowers, garden equipment and the like, carburetors with both a diaphragm fuel delivery pump and a diaphragm fuel metering system have been utilized. In operation, two-stroke engines utilizing these carburetors have a high level of hydrocarbon exhaust emissions which are detrimental to the environment and exceed and cannot meet the exhaust emission requirements imposed by the State of California and the emission requirements proposed by the Environmental Protection Agency of the United States Government and the governments of several other countries.

Due to the relatively low selling price of two-stroke small engines and particularly two-stroke engines for handheld power tools, it is not economically feasible to utilize electronic fuel injection systems such as those typically used for automotive vehicle applications. While various lower cost mechanical fuel injection systems have been proposed for two-stroke small engines, some have either failed to meet the California and proposed emission standards or are economically and/or technically unfeasible for commercial manufacture and sale for two-stroke small engine applications such as handheld power tools.

SUMMARY OF THE INVENTION

A fuel injection system for a two-stroke small engine which injects a rich fuel and air mixture directly into the cylinder of the engine. The fuel injection system has a charge forming device which supplies a rich fuel and air mixture to a tuned injector tube connected adjacent one end through a port or valve to the engine cylinder and adjacent the other end to the engine crankcase. The charge forming device has an injector air inlet and fuel mixing passage to which, under engine wide open throttle operating conditions, at least a majority of the fuel is supplied by a high speed fuel circuit and preferably a minor portion of the fuel is also supplied by an idle fuel circuit. Preferably under engine idle conditions the idle circuit also supplies essentially all of the fuel to the engine. Under all engine operating conditions, a separate inlet air flow passage also supplies primary air to the crankcase of the engine from which it is transferred to the cylinder and under engine wide open throttle conditions preferably a very minor quantity of fuel (with a lubricant such as oil therein) is supplied through the engine inlet air flow passage to the crankcase and transferred to the cylinder to provide lubrication of the moving parts in the crankcase and some cooling of the engine. Preferably, fuel is supplied to the high speed, idle and crankcase circuits from a diaphragm type common fuel metering chamber and preferably fuel is supplied to the metering chamber by a diaphragm type fuel pump actuated by pressure pulses in the engine crankcase or the engine inlet air flow passage. Both the fuel injector mixing passage and the engine air flow passage each have throttle valves operably connected together to control in unison and provide proportional air flow through their separate passages. Preferably, both the fuel injector mixing passage and the engine inlet air flow passage also each have choke valves which are operably connected together so that they can be closed and opened in unison and provide proportional air flow through their passages for cold start fuel enrichment of the engine.

OBJECTS, FEATURES AND ADVANTAGES OF THE INVENTION

Objects, features and advantages of this invention include a fuel injection system for a two-stroke engine providing significantly decreased engine hydrocarbon exhaust emissions, significantly improved fuel economy, increased engine maximum horsepower output, improved engine starting and idle running stability, improved ease, repeatability and stability of calibration and adjustment of the fuel-air ratio and flow rate of the fuel and air mixture, improved combustion stability, synchronized simultaneous throttling of both the engine inlet air flow and the injector inlet air flow, synchronized simultaneous choking for cold starting of both the engine inlet air flow and the injector inlet air flow, improved engine cold starting and warm-up, significantly improved engine performance at elevated ambient temperatures, improved operating stability of the charge forming device over a wide range of orientations and positions of the charge forming device, an extremely compact construction and arrangement, a relatively simple design, extremely low cost when mass produced, and is rugged, durable, reliable, requires little maintenance and adjustment in use, and in service has a long useful life.

BRIEF DESCRIPTION OF THE DRAWINGS

These and other objects, features and advantages of this invention will be apparent from the following detailed description, appended claims, and accompanying drawings in which:

FIG. 10 is a full sectional view of the high-speed fuel injection nozzle of the charge-forming device;

FIG. 11 is an end view of the nozzle of FIG. 10;

FIG. 12 is a fuel sectional view of a typical air jet of the charge-forming device;

FIG. 13 is an end view of the air jet of FIG. 12;

FIG. 14 is an exploded perspective view of a manifold and injector tube assembly for mounting a modified charge forming device and the injector tube on a two-stroke engine;

FIG. 15 is a front end view of the manifold assembly which mates with the charge-forming device;

FIG. 16 is a back end view of the manifold assembly which mates with the two-stroke engine;

FIG. 17 is a sectional view of the manifold assembly taken generally on line 17—17 of FIG. 15;

DETAILED DESCRIPTION OF THE PREFERRED EMBODIMENTS

Figure 1:
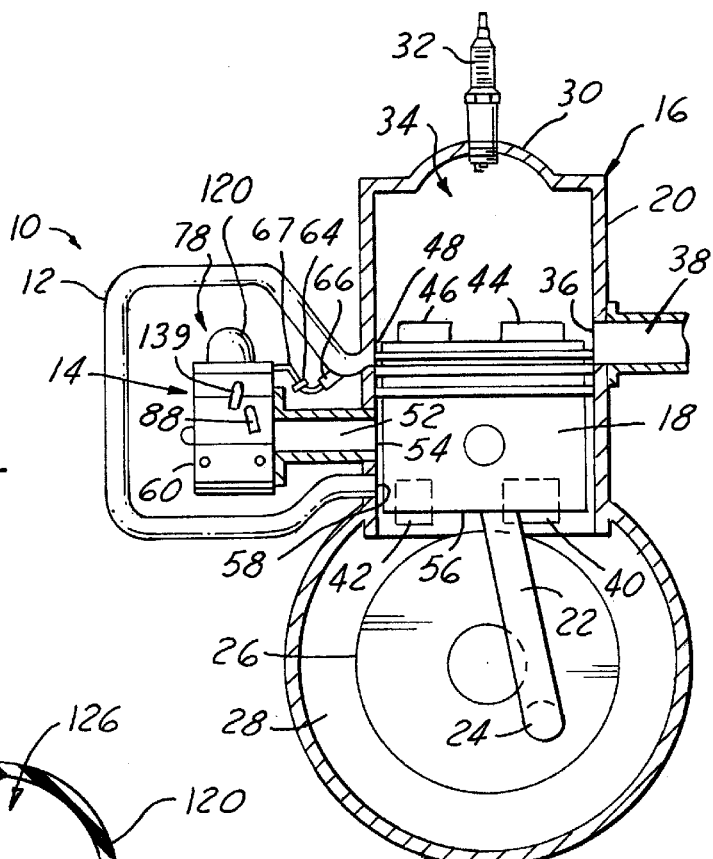
FIG. 1 is a semi-schematic side view partially in section of a fuel injection system with a charge forming device and an injector tube embodying this invention mounted on a two-stroke spark ignited internal combustion engine.

Referring in more detail to the drawings, FIG. 1 illustrates a fuel injection system 10 embodying this invention with a tuned injector tube 12 and a charge forming device 14 installed on a two-stroke spark ignition internal combustion small engine 16. Typically, the engine is powered by a hydrocarbon liquid fuel such as a mixture of gasoline and lubrication oil typically in a 50:1 ratio by volume. The two-stroke engine has a piston 18 received for reciprocation in a cylinder 20 and connected by a rod 22 to a throw 24 of a crankshaft 26 journalled by bearings for rotation in a crankcase 28. The piston and cylinder, in cooperation with a cylinder head 30 define a combustion chamber 34 in which a fuel and air mixture is compressed and ignited by a spark plug 32 to cause the piston to rotate the crankshaft in operation of the engine.

The engine has an exhaust port 36 and a connecting pipe 38 through which exhaust gases pass when the exhaust port is opened by the piston, air transfer passages 40 and 42 and corresponding cylinder ports 44 and 46 through which intake air is supplied to the combustion chamber when the ports are opened by the piston near bottom dead center (BDC), and an intake port 48 connected to one end of the injector tube 12 through which a rich air and fuel mixture is admitted to the combustion chamber through the port 48, while opened by the piston. Preferably, the intake port 48 and exhaust port 36 are diametrically opposed and the upper edge of the intake port 48 is slightly lower or further away from the cylinder head 30 than the upper edge of the exhaust port 36 so that the exhaust port opens slightly before the intake port. Primary air is admitted to the engine crankcase 28 from an intake passage 50 in the charge-forming device 14 through a connecting passage 52 and an air intake cylinder port 54 when opened by the skirt 56 of the piston. The other end of the injector tube 12 communicates with the crankcase through a port 58 when it is opened by the piston skirt 56.

As shown in FIGS. 1–7, the charge forming device 14 has a body 60 with an injector air and fuel mixing passage 62 for supplying a rich fuel and air mixture to the injector tube 12 through a check valve 64, nozzle or port 66 and a connecting tube 67. A liquid hydrocarbon fuel such as gasoline is supplied from a fuel metering assembly 68 to the injector air and fuel mixing passage 62 through an idle circuit 70 and a high speed fuel circuit 72, and to the engine air flow passage 50 (under high speed air flow conditions such as wide open throttle) through a fuel bleed circuit 74. Fuel is supplied from a tank (not shown) to the fuel metering assembly 68 when the engine is operating by a fuel pump assembly 76 and in preparation for starting the engine any air and vapor may be removed from the fuel metering assembly 68 and the metering assembly filled with liquid fuel by actuating a manual purge and primer pump assembly 78.

Figure 6:
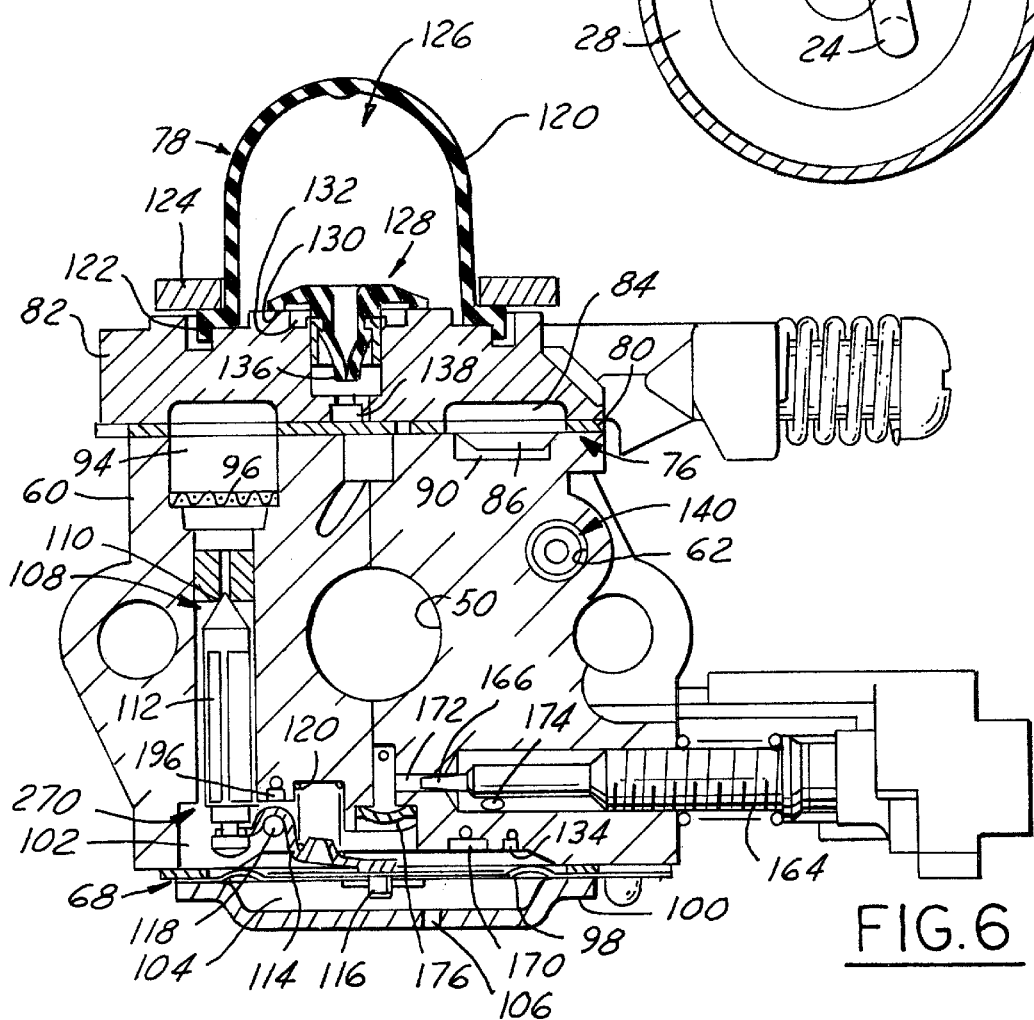
FIG. 6 is a sectional view of the charge forming device taken generally on line 6—6 of FIG. 2.
Figure 2:
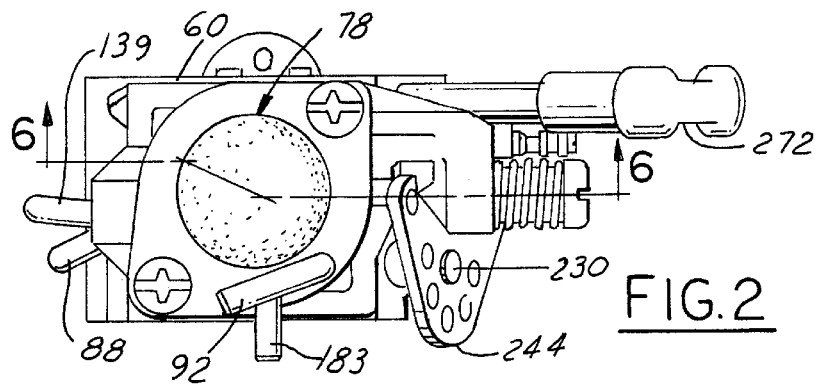
FIG. 2 is a top view of the charge-forming device of FIG. 1.

As shown in FIG. 6, the fuel pump assembly 76 has a flexible diaphragm 80 received and sealed between an upper face of the body 60 and a lower face of an upper cover 82 and defining in part a fuel pump chamber 84 and a pulse chamber 86 to which vacuum and pressure pulses in the crankcase of the two-cycle engine are introduced through a tube fitting 88 and interconnecting passageways 90 in the upper cover to repeatedly flex or actuate the diaphragm 80. Flexing of the diaphragm 80 draws fuel from a fuel tank (not shown) through a fuel inlet tube fitting 92, a one-way check valve and interconnecting passages into the pump chamber 84 and supplies fuel under pressure from the pump chamber through a check valve, outlet passage 94 and a screen 96 to the fuel metering assembly 68.

As shown in FIG. 6, the fuel metering assembly 68 has a flexible diaphragm 98 received and sealed between a lower face of the body 60 and a peripheral portion of a lower cover 100 to define a fuel metering chamber 102 on one side of the diaphragm and an atmospheric air chamber 104 on the other side of the diaphragm which communicates with the atmosphere exteriorly of the carburetor through a port 106 in the lower cover. The flow of fuel from the pump 76 into the fuel chamber 102 is controlled by a flow valve assembly 108 with a seat 110 engageable by a complementary valve head 112. The flow valve 108 is opened and closed to control the admission of fuel into the chamber 102 by movement of the diaphragm 98 which is operably connected to the valve head 112 by a lever 114 which is connected adjacent one end to the valve head, adjacent the other end bears on a button 116 attached to the center of the diaphragm and between its ends is pivotally mounted on a support shaft 118. The valve head 112 is yieldably biased to its closed position by a spring 120 bearing on the lever 114 and received in a pocket in the metering chamber. In operation of the fuel metering device 14, as fuel is drawn from the fuel chamber 102 and supplied to the operating engine, the diaphragm 98 is displaced to open and close the flow valve 108 to replenish the fuel in the metering chamber and to maintain the fuel in the chamber at a substantially constant pressure relative to the atmospheric pressure acting on the other side of the diaphragm.

When the engine 16 is not operating and in preparation for starting it, the primer pump 78 may be manually actuated to expel any air and/or fuel vapor from the fuel metering chamber 102 and to fill it with liquid fuel before starting the engine. As shown in FIG. 6, the primer pump has a flexible rubber dome 120 with a lip 122 attached and sealed to the upper cover 82 by a retainer plate 124, defining a pump chamber 126 and enclosing a combination mushroom-shaped valve 128 assembly. The valve assembly 128 has an inlet check valve 130 communicating through an underlying annular passage 132 and interconnecting passages 134 in the cover plate 82 and body 60 (only some of which are shown) with the fuel metering chamber 102. The valve assembly 128 also has an outlet or discharge check valve 136 communicating through passages 138 and an outlet tube fitting 139 in the in the cover plate with an upper portion of the fuel tank. Preferably, a check valve is also disposed in the passages 138 to isolate the metering chamber 102 from tank pressure if any leakage were to occur in the purge and primer pump 78. In use, the purge and primer pump 78 is operated by repeatedly manually alternately pressing down on and collapsing the dome and releasing it to allow it to return toward its unflexed state. When the collapsed dome is released, and as it returns toward its unflexed state, air and fuel vapor in the metering chamber 102 flows through the passages 134, 132 and the check valve 130 into the pump chamber 126 and as the dome is pressed and collapsed, the air and fuel vapor in the chamber 126 flows through the outlet valve 136, passages 138, tube fitting 139 and is discharged into the fuel tank.

Figure 7:
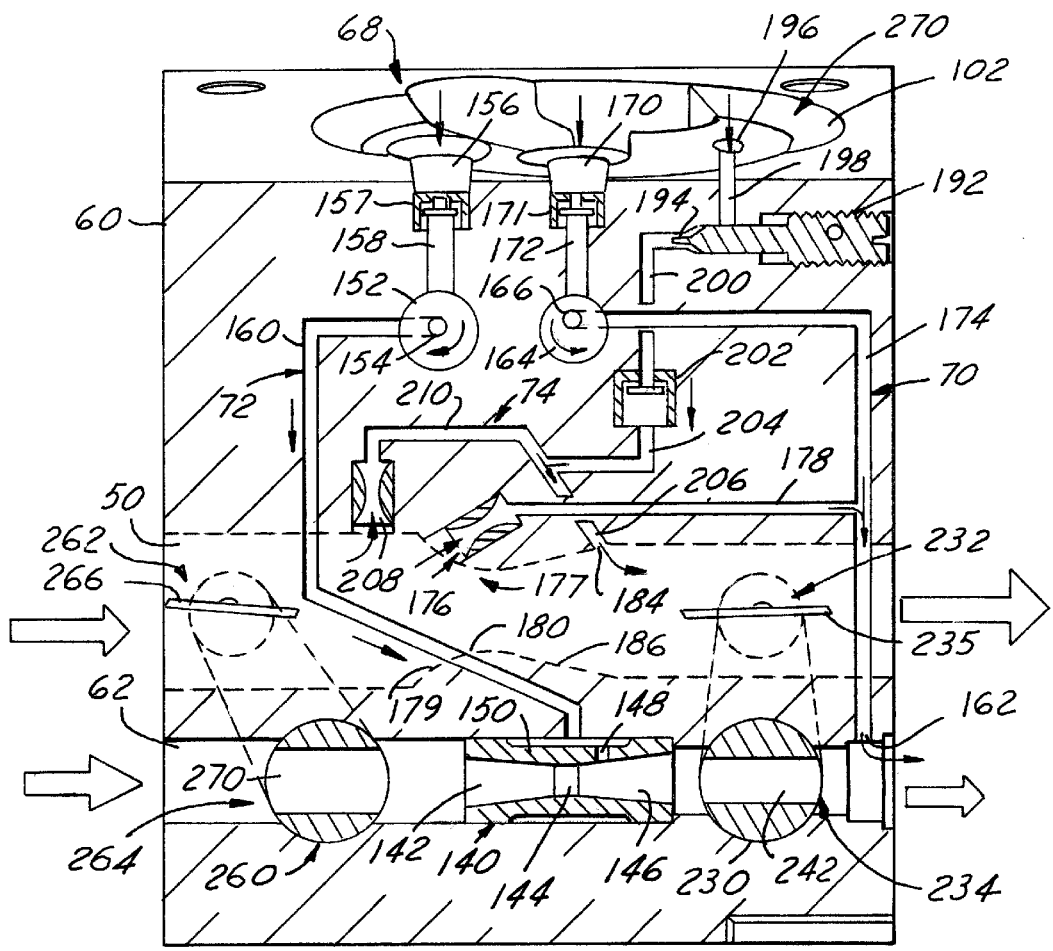
FIG. 7 is a semi-schematic sectional view with components shown out of position of the air flow and fuel flow paths of the charge forming device of FIG. 1.

As best shown in FIG. 7, the injector mixing passage 62 has a venturi or nozzle 140 therein with a converging inlet 142, throat 144 and diverging outlet 146 to which fuel is supplied through a port 148 and an annular recess 150 from the fuel metering chamber 102 through the high speed circuit 72. The high speed circuit 72 has a flow rate adjustable needle valve 152 threadably received in the body 60 and with a tip 154 communicating with the metering chamber 102 through a port 156, check valve 157 and a passage 158 and with the nozzle 140 through interconnecting passages 160 in the body 60, to calibrate the rate of flow of fuel to the nozzle. The check valve 157 prevents back bleeding of air into the metering chamber 102 during operation of the purge and primer pump 78.

If desired, all the fuel could be supplied to the nozzle 66 in the tuned tube 12 through the high-speed nozzle 140 and circuit 72. However, for most applications, it is preferred, under idle engine operating conditions, to supply fuel to the injector mixing passage 62 through a separate port 162 preferably downstream of the high speed nozzle 140 and the separate idle circuit 70. To adjust and calibrate fuel flow, the idle circuit 70 has a needle valve 164 threadably received in the body 60 and having a tip 166 communicating with the fuel metering chamber 102 through a separate port 170, check valve 171, and passage 172 in the body and with the fuel outlet port 162 through passages 174 in the body. The check valve 171 prevents back bleeding of air into the metering chamber 102 when the purge and primer pump 78 is actuated. Preferably to assist in providing a dispersion of the idle fuel in air and to avoid pooling or pudding of idle fuel in the injector mixing passage 62, an idle air jet 176 in the engine air flow passage 50 may communicate with the idle port 162 through a branch passage 178 connected to the fuel passage 174 so that in operation an air and fuel dispersion is discharged from the port 162. Preferably, the idle air jet 176 communicates with the engine primary air passage 50 through a venturi 177 therein and preferably in a converging portion 179 of the venturi upstream of its throat 180. Downstream of the idle port 162, the engine injector passage 62 communicates through passages 181 and 182 (FIG. 4) with an outlet tube fitting 183 connected by the flexible hose 67 (FIG. 1), check valve 64 and nozzle 66 to the tuned tube 12. Other configurations can be utilized that communicate the injector passage 62 directly to the engine injection apparatus without need for internal passages 181, 182 and fitting 183.

To provide engine cooling and crankcase lubrication under wide open throttle engine operating conditions, a small quantity of fuel is supplied to the engine air passage 50 (FIG. 7) through a port 184 and the fuel and air bleed circuit 74. Preferably, the port 184 is located immediately downstream of a diverging portion 186 of the venturi 177 but it can be located anywhere in the engine air passage 50. To calibrate and adjust fuel flow to the port 184, the circuit 74 has an adjustable needle valve 192 threaded in the body 60 with a tip 194 communicating with the fuel metering chamber 102 through a separate port 196 and passage 198 and with the port 184 through passages 200, a check valve 202 and passages 204 and 206. To facilitate adjustment and control of the small quantity of fuel supplied to the port 184, preferably an air bleed jet 208 or similar bleed passage orifice opening into the engine air flow passage 50 preferably upstream of its venturi 177 communicates through a passage 210 with the fuel passage 204 to supply a fuel and air dispersion to the port 184 which is preferably located downstream of the venturi 177. To ensure that the check valve 202 remains open during normal engine operation, it is located between the needle valve 192 and the port 184 so that it is subjected to a greater pressure differential. The check valve 202 prevents back bleeding of air into the metering chamber 102 when the purge and primer pump is actuated.

In engine operation, under idle conditions, preferably all of the fuel is supplied to the engine through the idle port 162 and under wide open throttle conditions, of the total quantity of fuel supplied to the engine about 80% is supplied through the high speed nozzle 140 and circuit 72, about 15% is supplied through the idle port 162 and circuit 70 and about 5% is supplied through the port 184 and associated circuit 74. In a modified form, for some applications, the idle circuit 70 and port 162 can be eliminated and the bleed circuit 74 and port 184 and jet 208 configured and sized to supply to the engine crankcase 28 sufficient fuel to both operate the engine under idle conditions and provide lubrication and cooling under high speed and wide open throttle operating conditions.

In operation, fuel vapor bubbles typically are generated and coalesce in the subatmospheric pressure environment of the metering chamber 102 which are believed to be caused by inherent gaseous properties of hydrocarbon fuels exacerbated by vibration, thermal affects on the fuel and turbulence generated by the fuel pump 76 and operation of the fuel metering valve 108. To minimize, if not avoid, vapor bubbles in the fuel supplied to the idle and high speed circuits 70 and 72 and thus the injector mixing passage 62, preferably the body 60 is oriented relative to the engine so that in its normal operating position, the plane of the metering chamber 102 or its metering diaphragm 98 is inclined to a horizontal plane preferably at least about 20° to 30°. So oriented, fuel vapor bubbles tend to collect (due to buoyancy) in a vertically uppermost portion of the metering chamber adjacent an outer edge in a region 270 and the inlet ports 156, 170 and 196 for the fuel circuit are strategically located in the metering chamber relative to this vapor bubble collection region.

As shown in FIGS. 6 and 7, the high speed circuit inlet port 156 and idle circuit inlet port 170 both communicate with the metering diaphragm in a location remote from the fuel bubble collection region 270 when the carburetor is in its normal orientation and are located at a lower vertical height or level than the vapor bubble collection region 270. To remove the vapor bubbles from the metering chamber, preferably the inlet port 196 to the crankcase bleed fuel circuit 74 is located in the vapor bubble collection region 270 and when in the normal operating orientation of the metering chamber the inlet port 196 is at a vertically higher location than that of the inlet ports 170 and 156 to the idle and high speed fuel circuits. While this removal of vapor bubbles results in a reduction of variation in the fuel-to-air ratio of the mixture delivered to the engine crankcase during each cycle, it is subsequently averaged from cycle to cycle by the dwell time in and volume of the crankcase, thermal flash-off of liquid fuel droplets to vapor, and turbulence in the crankcase to provide a relatively uniform but extremely small fuel-to-air ratio of the mixture transferred from the crankcase to the engine cylinder to assist stabilization of combustion for each cycle. This is particularly true since the fuel mixture supplied from the crankcase is a very small fraction (typically $\frac{1}{20}^{th}$) of the total quantity of the fuel and air mixture supplied to the engine cylinder for each combustion cycle under wide open throttle conditions. This small amount of fuel inducted into the engine crankcase has a minimal impact for elevating hydrocarbon exhaust emissions.

FIGS. 12 and 13 illustrate a preferred form 212 of the air jets 176 and 208 having a body 214 with external threads 216 and a tool-receiving slot 218 for threading the jet into the body 60 to secure it therein. The jet 212 has a through passage 220 with a venturi 222 having a converging inlet portion 224, a throat 226 and a diverging outlet portion 228. However, it may also be possible to utilize non-complex air jet configurations such as drilled passages, step bores, or plugs/caps having a fixed orifice to restrict air flow.

Figures 3, 4:
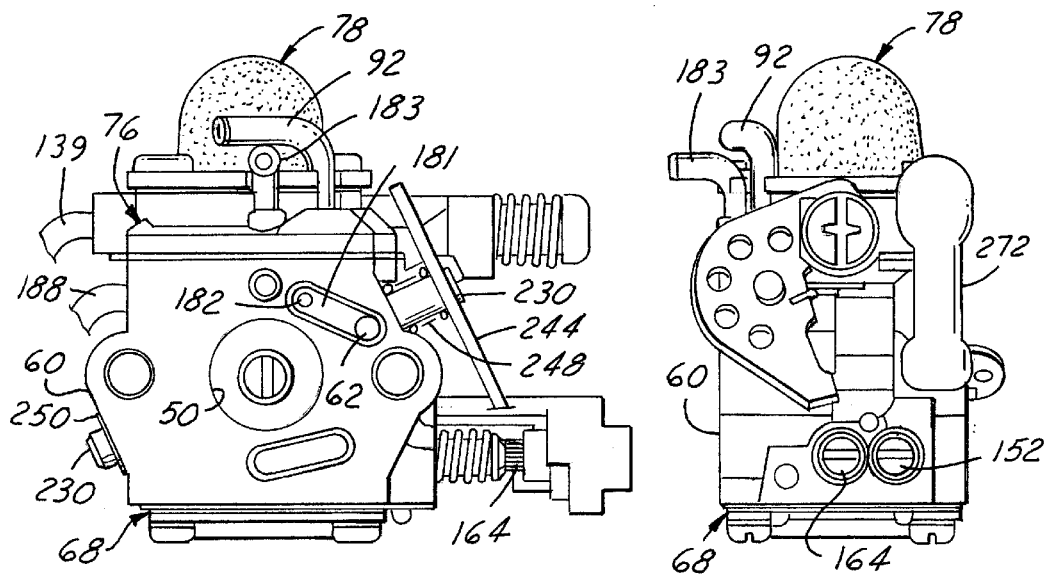
FIG. 3 is a side view of the charge-forming device.
FIG. 4 is a back end view of the charge-forming device.
Figure 5:
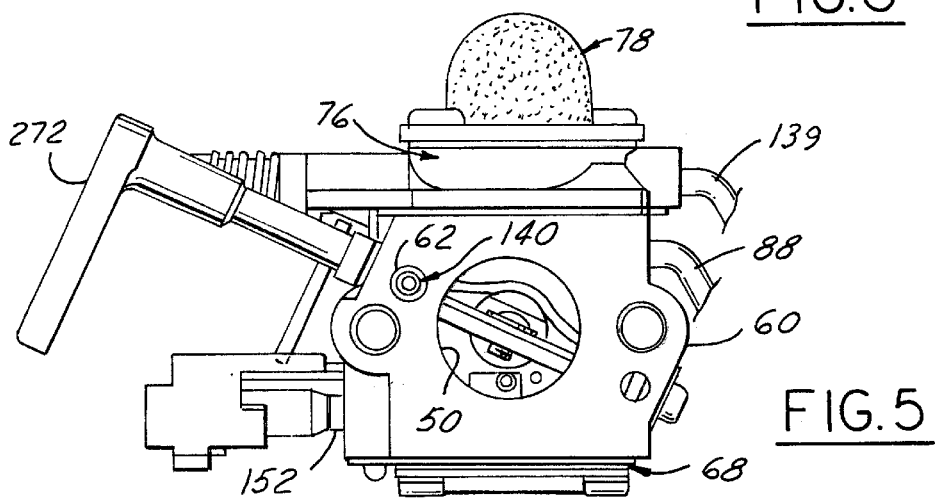
FIG. 5 is a front end view of the charge-forming device.
Figure 8:
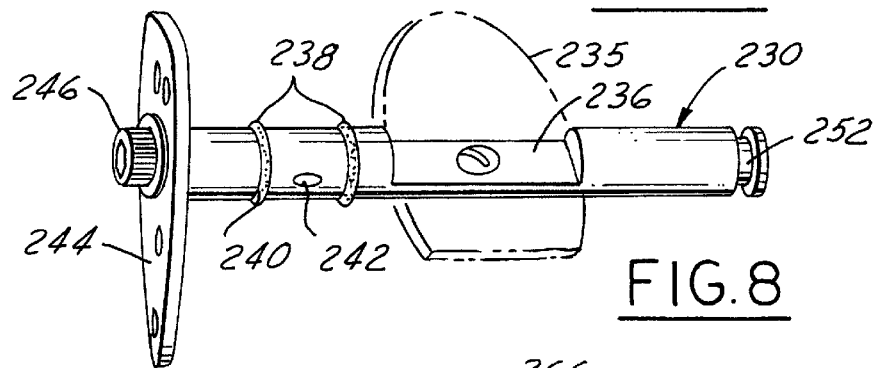
FIG. 8 is a perspective view of the throttle shaft and valves of the charge forming device.
Figure 9:
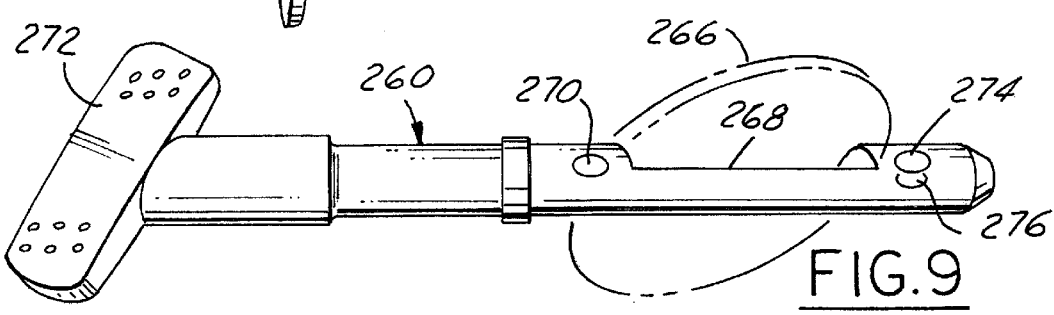
FIG. 9 is a perspective view of the choke shaft and valves of the charge forming device.

As best shown in FIGS. 7 and 8, a single throttle shaft 230 extends transversely through both the engine air intake passage 50 and the injector passage 62 and is journalled for rotation in the body 60 to simultaneously open and close in unison both a throttle valve 232 in the engine air passage 50 and a throttle valve 234 in the injector mixing passage 62 to provide proportional air flow in both passages. A disc 235 of the throttle valve 232 is received in a slot 236 in the shaft 230 and secured therein by a screw and a seal is provided between the throttle shaft 230 and the injector passage 62 to prevent leakage into the injector passage by a pair of O-rings 238 received in spaced-apart grooves 240 in the shaft with a transverse through-hole 242 of the throttle valve 234 between them. For rotating the shaft to open and close the throttle valves, a lever or plate 244 is attached on one end of the shaft by a screw 246, or other method of attachment for the lever. As shown in FIG. 4, in assembly, a spring 248 is received over the shaft between the lever arm and the body 60 and the shaft is retained in the body by a C-washer 250 received in a groove 252 adjacent the other end of the shaft 230. In assembly, preferably the axis of the shaft 230 intersects the axes of both the passages 50 and 62, and in the fully open position of the valve 234, the axis of its through hole 242 is coincident with the axis of the passage 62.

For cold starting of the engine, a single choke shaft 260 extends transversely through the engine air intake and injector passages 50 and 62 to simultaneously open and close in unison both a choke valve 262 in the engine air passage and a choke valve 264 in the injector passage. A disc 266 of choke valve 262 is received in a recess 268 in the shaft and secured to it by conventional methods, such as a screw. A hole 270 extends transversely through the shaft 260 for inducting air into the interior passage 62. A handle 272 for manually rotating the shaft to open and closed positions of the choke valves is attached to one end of the shaft and in assembly a spring-biased detent ball in the body 60 is yieldably received in one of the pockets 274 or 276 in the shaft adjacent its other end to yieldably retain the shaft in either the closed, an intermediate choke position, or fully opened position of the choke valves 262 and 264. In assembly, preferably the axis of the choke shaft intersects the axes of both the passages 50 and 62 and in the fully open position of the choke valve 264, the axis of its through hole 270 is coincident with the axis of the passage 62. In the fully closed position of the choke valve 264, preferably the shaft 260 completely closes the passage 62 upstream of the idle fuel port 162. Other orifice configurations or geometric features, such as a groove or flat, can also be used to accomplish the same function and purpose as the through hole 270.

In a modification of the fuel injection system, both a charge-forming device and an injector tube may be attached to a manifold releasably mounted on a two-stroke engine. FIGS. 14–17 illustrate a manifold 280 with an engine mounting plate 282 releasably attachable to an engine by bolts 284 and a mounting plate 286 for the charge-forming device releasably secured to the engine mounting plate 282 with a gasket 288 between them by bolts 290. Threaded studs 292 for securing the charge-forming device to the mounting plate 286 are secured in threaded bores 294 in the plate 286. When mounted on the engine 12, this manifold 280 preferably disposes the fuel mixing chamber 102 and diaphragm 98 in a nearly vertical plane when in its normal operating position which facilitates collecting in and removing fuel vapor bubbles from region 270 of the metering chamber. When the charge-forming device is attached to the mounting plate 286, the downstream end of its air intake passage 50 is coincident and communicates with a bore 296 through the plate which is coincident and communicates with a bore 298 through the engine mounting plate 282 which in turn communicates with the crankcase port 54 of the engine. The downstream end of the engine injector passage 62 of the modified charge-forming device opens through the back face of the body 60 and is coincident and communicates with a bore 300 through the mounting plate 286 with a counterbore in which a check valve 302 is received and communicates with an elongate slot 304 through the engine mounting plate 282 which communicates with the cylinder intake port 48 of the engine 10. Through a connector fitting 306, the upper end of a tuned injector tube 12' also communicates with the slot 304 and hence both the injector passage 62 downstream of the check valve 302 and the engine intake port 48 to the cylinder upstream thereof. The lower end of the injector tube 12' communicates through a fitting 308 with a right angle passage 310 through the mounting block 286 which communicates with an elongate slot 312 through the engine mounting plate 282 in FIG. 16 which communicates with the crankcase port 58 of the engine 10. The modified charge-forming device utilized with this manifold 280 is essentially the same as the charge forming device 14 except that the passages 181, 182, connector fitting 183, connector tube 67, check valve 64, and nozzle 66 are eliminated and the rich fuel and air mixture in the downstream end of the injection passage 62 flows directly into the manifold and check valve 302. Alignment pins 314 are press fitted in the engine mounting plate 282 and in assembly slidably received in complementary blind holes in the engine.

Engine Operation

During cranking and operation of the engine 16, when the piston 18 is near either side of top dead center, a subatmospheric pressure is created in the crankcase 28 and the port 58 is opened by the piston skirt 56 to apply this subatmospheric pressure to the tuned tube 12 or 12' from its lower end which causes a rich fuel and air mixture from the injector mixing passage 62 of the charge forming device 14 to be introduced through the check valve 64 and nozzle or port 66 into the tuned tube 12 or the check valve 302 into the tuned tube 12' adjacent the top or other end of the tube and hence the intake port 48 which is closed by the piston. As the engine piston continues to travel downward toward bottom dead center, the bottom of the piston skirt 56 closes the port 58 and hence the lower end of the turned tube 12 or 12' from the crankcase 28, thereby leaving the previously inducted charge of the rich fuel and air mixture resident in the upper portion of the tube. As the post combustion expansion pressure in the cylinder 34 continues to drive the piston further downward toward bottom dead center, the piston begins to uncover and travel past the exhaust port 36 near bottom dead center and exhaust gases begin to escape through the exhaust pipe 38. Soon after opening of the exhaust port 36, but immediately before the transfer ports 44,46 are uncovered by the piston and fresh air begins to enter the chamber, the injector intake port 48 is uncovered by the piston and the expansion pressure of combustion gases in the cylinder generates a pulse wave which is introduced into and travels down the tuned tube 12 or 12' and then is reflected back toward the still open intake port 48 to provide a reflected pneumatic pressure pulse which carries the previously induced charge of the rich fuel and air mixture from the tuned tube into the combustion chamber 34 (which is near atmospheric pressure due to the exhaust port 36 being opened) through the open port 48. On its return stroke, as the piston moves toward top dead center, it covers and closes the injector intake port 48 and compresses the fuel and air mixture in the combustion chamber 34 for the next combustion event and opens the crankcase port 58 for communication of the lower end of the tube 12 or 12' with the subatmospheric crankcase pressure to repeat the fuel induction and injection cycle. The tuned tube 12 or 12' is of sufficient length and diameter that the fuel and air mixture charge inducted therein does not flow into the engine crankcase 28 while the port 58 is open.

As noted above, after the combustion event and as the piston moves toward bottom dead center, after opening the exhaust port 36, it also opens the transfer ports 44 and 46 to transfer compressed air from the crankcase 28 into the cylinder to scavenge and aid in removing the exhaust gases, provide fresh air for the subsequent combustion event, and to retain in the combustion chamber 34 and preferably provide homogenous dispersion of the rich fuel and air mixture discharged from the open inlet port 48. After passing through bottom dead center, as the piston 18 returns toward top dead center, and after closing the intake port 48 (and usually transfer ports 44 and 46 and the exhaust port 38), the skirt 56 of the piston also opens the crankcase port 54 to draw fresh air through the air intake passage 50 of the charge forming device 14 and into the crankcase where, after the combustion event, as the piston moves from top dead center toward bottom dead center, the crankcase port 54 is closed and the compressed air is transferred into the combustion chamber 34 through the passages 40 and 42 when the transfer ports 44 and 46 are opened by the piston 18.

Injector System Operation

With the fuel injector system 12, normally preparatory to starting the engine 16, the purge and primer pump 78 is manually actuated as previously described to remove any fuel vapor and air from the metering chamber 102 and ensure that the metering chamber is filled with liquid fuel. During both cranking and running of the engine, pressure and vacuum pulses produced in the engine crankcase 28 actuate the fuel pump 76 as previously described to supply liquid fuel under pressure to the fuel metering assembly 68 which provides a quantity of liquid fuel in the metering chamber 102 at a substantially constant pressure relative to the atmosphere. Under engine cold starting and warm-up conditions, the choke valves 260 and 264 are closed by manually turning shaft 260 and under engine warm or hot starting and running conditions, these choke valves are normally open.

Under engine idle operating conditions and preferably start-up conditions, the throttle valves 232 and 234 are substantially closed, and the engine crankcase subatmospheric pressure applied through the tuned tube 12 or 12' to the injector passage 62 of the charge forming device 14, draws fuel from the metering chamber 102 through the idle circuit 70 and the idle port 162 into the passage 62 where it is mixed with air flowing through the passage to form a rich fuel and air mixture which is delivered through check valve 64 or 302 to the upper end of the tuned injector tube 12 or 12'. The check valve 64 or 302 isolates the injector passage 62 from superatmospheric pressure fluctuation in the tuned injector tube 12 or 12' and may be a reed or disc type valve. Under idle conditions, essentially all of the fuel for the engine is supplied by the idle circuit 70 and port 162 because the high speed circuit 72 is not active since the throttle valve 242 is substantially closed and a relatively small quantity of air flows through the injector passage 62. Similarly, the crankcase fuel circuit 74 and port 206 are not active because the throttle valve 232 in the air intake passage 50 is closed and there is relatively little air flow through this passage. Under engine cold start and warm-up conditions, the choke valves 262, 264 are closed, with the throttle valves 232, 234 typically open, and thus even less air flows through the passages 50, 62 and more fuel flows through the idle circuit 70 and idle port 162 and high speed passage 72 and injector nozzle 140 to provide a richer fuel to air mixture for engine cold starting and warm-up conditions. Engine startability is enhanced by the chokes simultaneously restricting engine inlet and injector inlet air flow.

Under normal operating conditions with choke valves 262, 264 fully open, as the throttle valves 232, 234 are progressively opened by turning the shaft 230, more air flows through the air intake and injector passages 50, 62 and at wide open throttle operating conditions, most of the fuel is supplied to the engine through the high speed circuit 72 and nozzle 140 in response to crankcase subatmospheric pressure conditions applied to the injector tube 12 or 12' and hence the injector passage 62 when the engine crankcase port 54 is opened. At wide open throttle operating conditions, the pressure differential in the air intake passage 50 is sufficient to cause the fuel bleed circuit 74 and the port 206 to introduce a small quantity of fuel dispersed in air into the primary air intake passage 50 and the crankcase 28 when the port 54 is opened for lubrication and cooling of the engine and which is transferred through the passages 40 and 42 into the combustion chamber 34 for combustion when the transfer ports 44 and 46 are opened. This small quantity of fuel also contains any vapor bubbles which may have coalesced in the metering chamber 102 for dispersal into the engine crankcase 28.

Under wide open throttle operating conditions, the air and fuel bleed circuit 74 and port 206 supplies about 5% of the total fuel demand of the engine, the idle circuit 70 and port 162 supplies about 15% of the total fuel demand, and the high speed circuit 72 and nozzle 142 supplies about 80% of the total fuel demand. Thus, under wide open throttle operating conditions, about 95% of the total fuel demand of the engine is injected through the tuned tube 12 or 12' directly into the combustion chamber 34 of the engine cylinder and under idle operating conditions, a large percentage of engine idle fuel demand is injected through the tube directly into the cylinder. However, under idle conditions, some smaller percentage of fuel is drawn into the crankcase through the lower port of the tube 12 due to fuel pooling in the bottom of tube 12 at low speed. Usually, the quantity of fuel supplied to the crankcase is kept to a minimum to ensure compliance with hydrocarbon exhaust emission requirements. Since the magnitude of the pressure differential in the air intake passage 50 significantly decreases when the air flow is throttled to less than wide open throttle, the fuel contribution from the fuel bleed circuit 74 into the engine crankcase 28 diminishes automatically as engine speed and throttle opening decreases. However, as noted above, in some engine applications, the idle circuit 70 and port 162 may be eliminated and the bleed circuit 74 and port 184 configured and sized similar to a conventional diaphragm carburetor idle or slow speed circuit will provide to the engine crankcase 28 sufficient fuel for engine starting, engine idle operation, and high speed lubrication and cooling while still complying with engine emission requirements.

Second Embodiment

Figure 18:
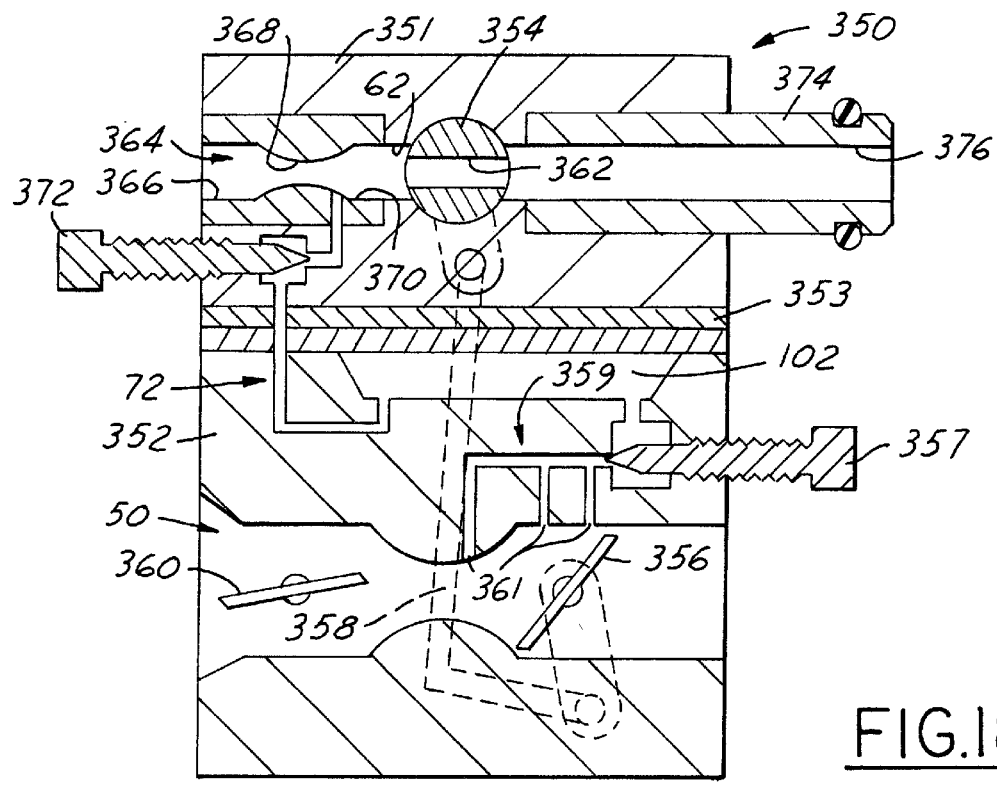
FIG. 18 is a semi-schematic sectional view of an alternate embodiment charge-forming device embodying the invention.

As shown in FIG. 18, an alternate charge forming device 350 in accordance with the invention has the fuel injector or high speed circuit 72 contained substantially within an injector block 351 fixed to the body 352 of a substantially conventional carburetor with one or more gaskets 353 between them. Desirably, a throttle valve 354 in the injector mixing passage 62 is connected to and communicated with a throttle valve 356 in the engine air intake passage 50 by an external linkage 358 which provides proportional rotation of the throttle valves 354, 356. If desired, a choke valve may be provided in the injector mixing passage 62 and linked to a choke valve 360 in the engine air intake passage 50 as previously described or with an external linkage. An adjustable needle valve 357 controls fuel flow through a low speed fuel circuit 359 which supplies fuel to the air intake passage 50 through one or more ports 361 under at least some engine operating conditions as in some conventional carburetors. If desired, the low speed fuel circuit 359 may be used to provide up to 100% of the engine fuel requirements at idle and as little as 5% at wide open throttle engine operation.

The throttle valve 354 in the injector mixing passage 62 has a through hole 362 and is rotatable relative to the passage 62 to control the flow area of the hole 362. The throttle valve 354 is preferably downstream of a nozzle 364 or venturi having an entrance 366, throat 368 and diverging exit 370 leading to the throttle valve 354. Fuel is delivered through the fuel circuit 72 to the injector mixing passage 62 downstream of the throat 368 of the nozzle 364 and upstream of the throttle valve 354. A needle valve 372 adjustably carried by the block 351 controls the flow of fuel from the metering chamber 102 to the injector mixing passage 62. A fuel and air mixture which flows through the throttle valve 354 continues through an exit tube 374 carried by the block 351 and having a passage 376 coaxial with the injector mixing passage 62. The exit tube 374 is constructed to receive a conduit (not shown) which receives the fuel and air mixture after it leaves the passage 62 of the charge forming device 350. The operation of this charge-forming device 350 is preferably the same as described with regard to the first embodiment of the invention.

Figure 19:
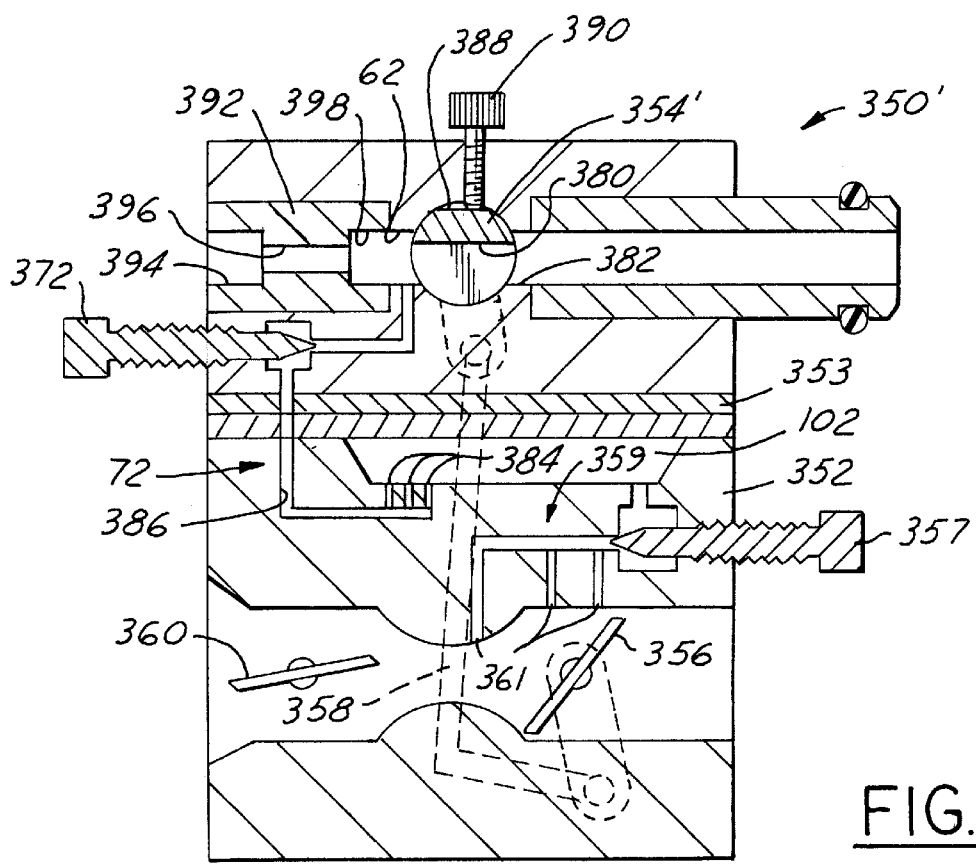
FIG. 19 is a semi-schematic sectional view of a modified charge-forming device similar to that of FIG. 18.

As shown in FIG. 19, to prevent puddling or pooling of liquid fuel upstream of the throttle valve, a modified device 350' has a throttle valve 354' with a rectangular slot 380 which is open to a lower wall 382 of the injector mixing passage 62 to eliminate a step or shoulder of the throttle valve 354 as may occur with the hole 362 through the throttle valve 354 as shown in FIG. 18.

Also, to reduce the size of fuel vapor bubbles which are delivered from the fuel metering chamber 102 to the injector mixing passage 62, a plurality of smaller outlets 384 are formed in the fuel metering chamber 102 which all lead to the same passage 386 for delivering fuel to the injector mixing passage 62. Each of these outlets 384 is preferably smaller in diameter than the single outlet shown in FIG. 18 and each preferably has a diameter smaller than the diameter of the passage 386, to prevent large vapor bubbles from being delivered from the fuel metering chamber 102. Rather, any large vapor bubbles or collection of bubbles which form or collect in the fuel metering chamber 102 will be broken up as they pass through the small diameter outlets 384 and entrained in liquid fuel flowing through the outlets and delivered via the passage 386 to the mixing passage 62. Further the surface of the fuel metering chamber 102 is preferably polished in the vicinity of the outlets 384 to minimize the attachment or adhesion and coalescence of fuel vapor bubbles on any surface discontinuities or irregularities within the metering chamber 102. This reduces the size of fuel vapor bubbles delivered to the injector mixing passage 62 to prevent delivery of an intermittent overly lean fuel supply to the engine 16 due to the presence of large vapor bubbles and not a similar volume of liquid fuel.

Still further, to facilitate setting the idle position of the throttle valve in the injector mixing passage 62, a flat surface 388 may be formed on the shaft 354' and a screw 390 may be provided in the block 351 to contact this flat surface 388 for locating and setting the idle position of the throttle valve 354'. Still further, the venturi or nozzle 364 may be replaced with a step bore insert 392, or the formation of stepped bores directly in the block 351 itself, to provide similar air flow characteristics as the nozzle 364 and subsequent mixing of fuel and air in the injector mixing passage 62. The stepped bore arrangement, whether formed in an insert 392 carried by the block 351 or in the block itself, may consist of an inlet bore 394, a throat orifice 396 typically of about 0.060 inch in diameter and leading to a diverging downstream portion 398 of 0.125 inch diameter. The stepped bore arrangement reduces fuel spit back due to the restriction of the throat orifice 396 and the dynamics of the flow resonating in stepped bore arrangement. The size of the throat 396 or air inlet bore is dependent on the strength of the vacuum signal from the downstream fuel injector apparatus on the engine.

Figure 20:
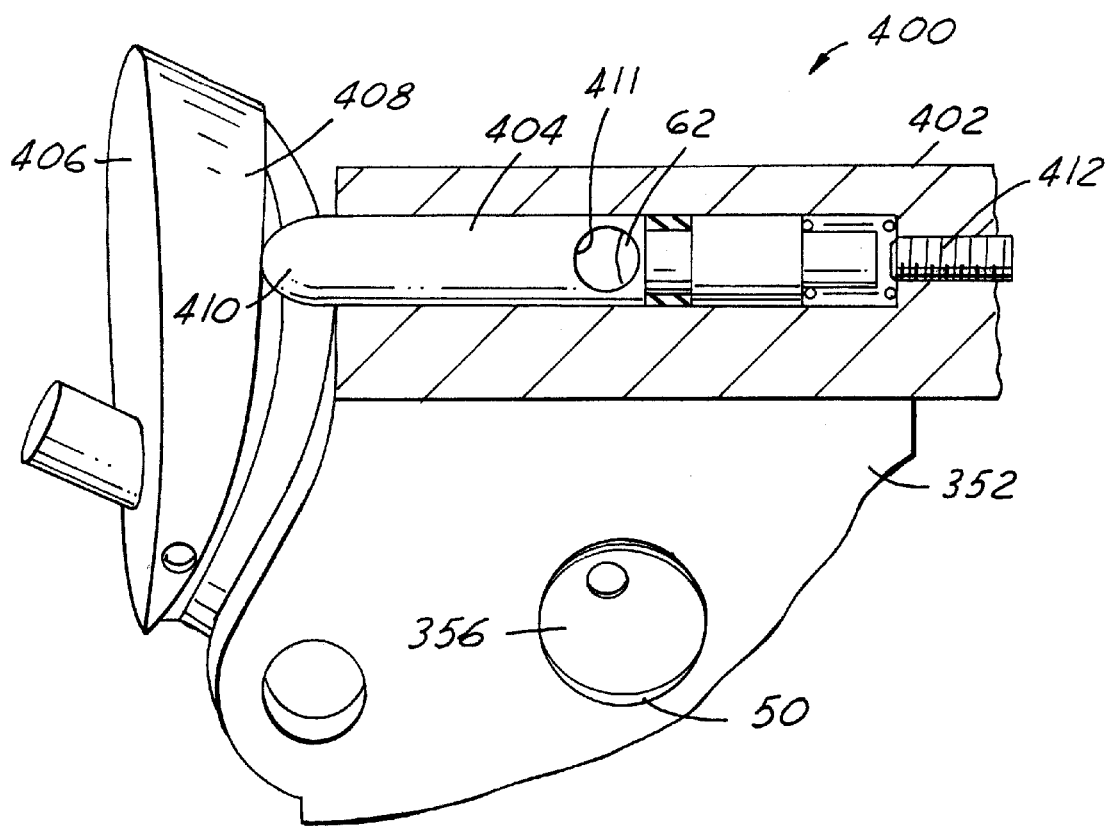
FIG. 20 is a fragmentary view with portions in section of another alternate embodiment of a charge-forming device embodying the invention.

As shown in FIG. 20, another charge forming device 400 having a separate injection block 402 utilizes a plunger type throttle valve 404 which is slidably received in the injector mixing passage 62 in the block 402 and is moved between advanced and retracted positions in proportion to the rotation of the throttle valve 356 in the engine air intake passage 50. To accomplish this, the throttle valve 404 has a cam 406 attached thereto with a ramp surface 408 increasingly engageable with a head 410 of the throttle valve 404 as the throttle valve 356 is rotated from its idle to its wide open throttle position. Increasing engagement of the ramp surface 408 with the throttle valve 404 advances the throttle valve 404 to move a hole 411 or other geometric configuration such as an annular slot or groove in the valve 404 relative to an injector mixing passage 62 to adjust the air and fuel flow through the injector mixing passage 62 and ultimately to the injector apparatus and engine. A screw 412 may be used to set and adjust the idle position of the throttle valve 404. This charge forming device 400 functions substantially the same as the previously described devices except for the sliding movement of throttle valve 404 rather than rotational movement and hence, it's operation and construction will not be described further.

What is claimed is:

1. For a two-stroke spark ignited internal combustion engine having a cylinder, a piston received for reciprocation in the cylinder, a crankshaft driven to rotate by the piston, a crankcase communicating with the piston and in which the crankshaft is received, a primary air intake port communicating with the crankcase, a transfer passage communicating with the crankcase and having a transfer port communicating with the cylinder, an exhaust port communicating with the cylinder, and an intake port communicating directly with the cylinder, a fuel injection system comprising:

a body, a primary air intake passage in the body having an inlet communicating with the atmosphere and an outlet constructed and arranged to communicate with the engine crankcase air intake port, a separate fuel injector passage in the body and having an inlet communicating with the atmosphere and an outlet constructed and arranged to communicate with an engine cylinder intake port, a fuel pump carried by the body and actuated by pressure variations produced by the operating engine to supply fuel to a fuel metering assembly, a fuel metering assembly having a fuel metering chamber receiving fuel from the fuel pump and in operation maintaining fuel in the metering chamber at a substantially constant pressure, a fuel circuit supplying fuel from the metering chamber to the fuel injector passage in operation to form a rich fuel and air mixture to be injected directly into the engine cylinder through the intake port, a first throttle valve in the primary air intake passage movable between substantially closed and wide open throttle positions to control in operation the flow of air through the primary air intake passage, a second throttle valve in the fuel injector passage and movable between substantially closed and wide open throttle positions to control the flow of air through the fuel injector passage, and an actuator connected with the first and second throttle valves to move them between their substantially closed and wide open throttle positions in operation to provide proportional air flow through the primary air intake and fuel injector passages so that under engine idle and wide open throttle operating conditions at least most of the total engine fuel requirement is supplied by a rich fuel and air mixture formed in the fuel injector passage and delivered directly through the intake port to the engine cylinder and most of the engine air intake requirement is supplied through the primary air intake passage.

2. The system of claim 1 wherein the actuator comprises a throttle shaft extending generally transversely through both of the passages, journalled for rotation in the body, and connected to both the first throttle valve and the second throttle valve to move the first and second valves in unison between their respective substantially closed and wide open throttle positions in response to rotation of the throttle shaft.

3. The system of claim 2 wherein the second throttle valve comprises a passage extending generally transversely through the throttle shaft and received in the fuel injector passage.

4. The system of claim 3 which also comprises a pair of spaced-apart seals between the throttle shaft and the body providing a seal between the fuel injector passage and the primary air intake passage, and the generally transverse passage through the throttle shaft is received between the seals.

5. The system of claim 4 wherein the seals comprise O-rings.

6. The system of claim 1 which also comprises a first choke valve in the primary air intake passage located upstream of the first throttle valve and movable between a closed position and a fully open position, a second choke valve in the fuel injector passage located upstream of the second throttle valve and movable between a closed position and a fully open position, and a choke actuator connected with both the first choke valve and the second choke valve to move them between their closed and fully open positions in operation to provide proportional air flow through the primary intake and fuel injector passages.

7. The system of claim 6 wherein the choke actuator comprises a choke shaft extending generally transversely through both of the passages, journalled in the body for rotation, and connected to both the first choke valve and the second choke valve for moving them in unison between their closed and full open positions in response to rotation of the choke shaft.

8. The system of claim 6 wherein the second choke valve comprises a passage extending generally transversely through the choke shaft and received in the fuel injector passage.

9. The system of claim 7 wherein the second choke valve comprises a hole extending generally transversely through the shaft and oriented so that when the second choke valve is in its fully open position, the axis of the hole extends substantially parallel to and substantially coincident with the axis of the fuel injector passage and the through-hole is received completely within the fuel injector passage.

10. The system of claim 1 which also comprises a venturi received in the fuel injector passage and the fuel circuit supplies fuel to the fuel injector passage through the venturi.

11. The system of claim 1 which also comprises a nozzle received in the fuel injector passage and having, a converging section, a throat, a diverging section, and in cooperation with the body defining an annular passage encircling the nozzle, a port communicating the annular passage with the interior of the nozzle, and the fuel circuit supplies fuel to the interior of the nozzle through the annular passage and the port.

12. The system of claim 1 wherein the fuel circuit also comprises a valve carried by the body and adjustable from the exterior of the body to adjust the flow of fuel through the circuit to the fuel injector passage.

13. The system of claim 1 which also comprises an idle circuit in the body for supplying fuel from the metering chamber into the fuel injector passage to form in operation a rich fuel and air mixture supplied to the intake port for injection directly into the engine cylinder under at least engine idle operating conditions.

14. The system of claim 1 wherein the first mentioned fuel circuit and the idle fuel circuit are constructed and arranged so that the idle circuit supplies essentially the entire engine fuel requirement when the engine is operating under idle conditions.

15. The system of claim 13 wherein the idle circuit is constructed and arranged so that it delivers fuel into the fuel injector passage under engine high speed and wide open throttle operating conditions.

16. The system of claim 13 wherein the idle circuit also comprises a bleed passage communicating with the air intake passage and in operation bleeding air from the air intake passage into the fuel supplied by the idle circuit to supply a fuel and air mixture to the fuel injector passage.

17. The system of claim 13 wherein the idle circuit also comprises a valve adjustable from the exterior of the body to vary and control the flow of fuel through the idle circuit from the metering chamber into the fuel injector passage.

18. The system of 13 wherein the idle circuit delivers fuel into the fuel injector passage immediately adjacent the downstream end of the fuel injector passage.

19. The system of claim 6 which also comprises an idle circuit in the body for supplying fuel from the metering chamber into the fuel injector passage downstream of the second choke valve and immediately adjacent the downstream end of the fuel injector passage to form in operation a rich fuel and air mixture supplied to the intake port for injection directly into the engine cylinder under at least engine idle operating conditions.

20. The system of claim 19 wherein the idle circuit also comprises a bleed passage communicating with the air intake passage and in operation bleeding air from the air intake passage into the fuel supplied by the idle circuit to supply a fuel and air mixture to the fuel injector passage.

21. The system of claim 16 which also comprises a venturi restriction in the primary air intake passage having a converging portion and the air bleed circuit communicates with the primary air intake passage through the converging portion of the venturi.

22. The system of claim 1 which also comprises a crankcase fuel circuit in the body for supplying fuel from the metering chamber to the primary air intake passage to form in operation a fuel and air mixture supplied to the engine crankcase for induction from the crankcase into the engine cylinder under at least wide open throttle engine operating conditions to provide only a minor part of the total fuel requirement of the operating engine under wide open throttle conditions.

23. The fuel system of claim 22 which also comprises a venturi in the primary air intake passage having a converging portion and the crankcase fuel circuit delivers fuel into the primary air intake passage downstream of the converging portion of the venturi.

24. The system of claim 23 wherein the crankcase fuel circuit also comprises a bleed passage communicating with the primary air intake passage upstream of the venturi and in operation bleeding air from the primary air intake passage into the fuel supplied by the crankcase circuit to the primary air intake passage upstream of such fuel entering the primary air intake passage.

25. The system of claim 24 wherein the crankcase fuel circuit also comprises an adjustable valve carried by the body to vary and control the rate of flow from the metering chamber into the crankcase fuel circuit and which cannot be adjusted by an end user from the exterior of the body when mounted on the engine.

26. The system of claim 22 wherein the crankcase fuel circuit also comprises an adjustable valve carried by the body to vary and control the rate of flow from the metering chamber into the crankcase fuel circuit and which cannot be adjusted by an end user from the exterior of the body when mounted on the engine.

27. The system of claim 22 wherein the crankcase fuel circuit is constructed and arranged in operation to not supply fuel to the primary air intake passage under engine idle operating conditions.

28. The system of claim 22 which also comprises an idle circuit in the body for supplying fuel from the metering chamber into the fuel injector passage to form in operation a rich fuel and air mixture supplied to the intake port for injection directly into the engine cylinder under at least engine idle operating conditions.

29. The system of claim 23 which also comprises an idle circuit in the body for supplying fuel from the metering chamber into the fuel injector passage to form in operation a rich fuel and air mixture supplied to the intake port for injection directly into the engine cylinder under at least engine idle operating conditions.

30. The system of claim 24 which also comprises an idle circuit in the body for supplying fuel from the metering chamber into the fuel injector passage to form in operation a rich fuel and air mixture supplied to the intake port for injection directly into the engine cylinder under at least engine idle operating conditions.

31. The system of claim 28 wherein the idle circuit also comprises a bleed passage communicating with the air intake passage and in operation bleeding air from the air intake passage into the fuel supplied by the idle circuit to the fuel injector passage upstream of the fuel entering the fuel injector passage.

32. The system of claim 29 wherein the idle circuit also comprises a bleed passage communicating with the air intake passage and in operation bleeding air from the air intake passage into the fuel supplied by the idle circuit to supply a fuel and air mixture to the fuel injector passage.

33. The system of claim 30 wherein the idle circuit also comprises a bleed passage communicating with the air intake passage and in operation bleeding air from the air intake passage into the fuel supplied by the idle circuit to supply a fuel and air mixture to the fuel injector passage.

34. The system of claim 33 wherein the idle circuit also comprises a valve carried by the body and adjustable from the exterior of the body to adjust and control the flow of fuel through the idle fuel circuit and into the fuel injector passage.

35. The system of claim 1 which also comprises a crankcase fuel circuit in the body for supplying fuel from the metering chamber into the primary air intake passage to form in operation a fuel and air mixture in the primary air intake passage which is supplied into the crankcase and transferred into the engine cylinder under at least engine idle and off-idle operating conditions.

36. The system of claim 16 wherein the air bleed circuit communicates with the primary air intake passage through an air jet in the form of a separate insert received in the body.

37. The system of claim 1 which also comprises adjustment means carried by the body to adjust the minimum opening of the second throttle valve from a fully closed position thereof to adjust and set the minimum speed of the engine when operating under idle conditions.

38. The system of claim 2 which also comprises adjustment means carried by the body to adjust the minimum opening of the second throttle valve from a fully closed position thereof to adjust and set the minimum speed of the engine when operating under idle conditions.

39. The system of claim 22 wherein when the body is mounted on an engine disposed in its normal operating position, the fuel metering chamber is inclined to a horizontal plane at an acute included angle of at least about 150 to promote the accumulation of any fuel vapor bubbles in a region of the metering chamber which is vertically higher than and generally laterally spaced from the location where the fuel circuit which supplies fuel to the fuel injector passage communicates with the metering chamber and the crankcase fuel circuit communicates with the metering chamber in the region in which the fuel vapor bubbles collect.

40. The system of claim 39 wherein in operation the crankcase fuel circuit ingests vapor bubbles from the metering chamber into the primary air intake passage at least during wide open throttle engine operating conditions.

41. The system of claim 28 wherein when the body is mounted on an engine disposed in its normal operating position, the fuel metering chamber is inclined to a horizontal plane at an acute included angle of at least about 150 to promote the accumulation of any fuel vapor bubbles in a region of the metering chamber which is vertically higher than and generally laterally spaced from both the location where the fuel circuit which supplies fuel to the fuel injector passage communicates with the metering chamber and the location where the idle fuel circuit communicates with the metering chamber, and the crankcase fuel circuit communicates with the metering chamber in the region in which the fuel vapor bubbles collect.

42. The system of claim 41 wherein in operation the crankcase fuel circuit ingests vapor bubbles from the metering chamber into the primary air flow before delivery into the engine crankcase at least during wide open throttle engine operating conditions.

43. The system of claim 29 wherein when the body is mounted on an engine disposed in its normal operating position, the fuel metering chamber is inclined to a horizontal plane at an acute included angle of at least about 15° to promote the accumulation of any fuel vapor bubbles in a region of the metering chamber which is vertically higher than and generally laterally spaced from both the location where the fuel circuit which supplies fuel to the fuel injector passage communicates with the metering chamber and the location where the idle fuel circuit communicates with the metering chamber, and the crankcase fuel circuit communicates with the metering chamber in the region in which the fuel vapor bubbles collect.

44. The system of claim 43 wherein in operation the crankcase fuel circuit ingests vapor bubbles from the metering chamber into the primary air intake passage at least during wide open throttle engine operating conditions.

45. The system of claim 26 wherein the crankcase circuit also comprises a check valve downstream of the flow adjustment valve and constructed and arranged to close to prevent reverse flow through the crankcase circuit to the fuel metering chamber.

46. The system of claim 1 which also comprises a tuned tube communicating adjacent one end with the cylinder intake port and adjacent the other end with the crankcase, and the downstream end of the fuel injector passage communicating with the tuned tube adjacent its one end and upstream of the cylinder intake port of the engine.

47. The system of claim 10 which also comprises a tuned tube communicating adjacent one end with the cylinder intake port and adjacent the other end with the crankcase, and the downstream end of the fuel injector passage communicating with the tuned tube adjacent its one end and upstream of the cylinder intake port of the engine.

48. The system of claim 13 which also comprises a tuned tube communicating adjacent one end with the cylinder intake port and adjacent the other end with the crankcase, and the downstream end of the fuel injector passage communicating with the tuned tube adjacent its one end and upstream of the cylinder intake port of the engine.

49. The system of claim 16 which also comprises a tuned tube communicating adjacent one end with the cylinder intake port and adjacent the other end with the crankcase, and the downstream end of the fuel injector passage communicating with the tuned tube adjacent its one end and upstream of the cylinder intake port of the engine.

50. The system of claim 22 which also comprises a tuned tube communicating adjacent one end with the cylinder intake port and adjacent the other end with the crankcase, and the downstream end of the fuel injector passage communicating with the tuned tube adjacent its one end and upstream of the cylinder intake port of the engine.

51. The system of claim 23 which also comprises a tuned tube communicating adjacent one end with the cylinder intake port and adjacent the other end with the crankcase, and the downstream end of the fuel injector passage communicating with the tuned tube adjacent its one end and upstream of the cylinder intake port of the engine.

52. The system of claim 27 which also comprises a tuned tube communicating adjacent one end with the cylinder intake port and adjacent the other end with the crankcase, and the downstream end of the fuel injector passage communicating with the tuned tube adjacent its one end and upstream of the cylinder intake port of the engine.

53. The system of claim 28 which also comprises a tuned tube communicating adjacent one end with the cylinder intake port and adjacent the other end with the crankcase, and the downstream end of the fuel injector passage communicating with the tuned tube adjacent its one end and upstream of the cylinder intake port of the engine.

54. The system of claim 39 which also comprises a tuned tube communicating adjacent one end with the cylinder intake port and adjacent the other end with the crankcase, and the downstream end of the fuel injector passage communicating with the tuned tube adjacent its one end and upstream of the cylinder intake port of the engine.

55. The system of claim 41 which also comprises a tuned tube communicating adjacent one end with the cylinder intake port and adjacent the other end with the crankcase, and the downstream end of the fuel injector passage communicating with the tuned tube adjacent its one end and upstream of the cylinder intake port of the engine.

56. The system of claim 1 which also comprises a manually actuated purge and primer pump carried by the body and communicating with the metering chamber for removing any fuel vapor and air from the metering chamber and ensuring the metering chamber is full of fuel preparatory to starting the engine.

57. The system of claim 56 which also comprises a check valve in the fuel circuit which closes to prevent reverse flow through the fuel circuit into the metering chamber when the purge and primer pump is actuated.

58. The system of claim 13 which also comprises a manually actuated purge and primer pump carried by the body and communicating with the metering chamber for removing any fuel vapor and air from the metering chamber and ensuring the metering chamber is full of fuel preparatory to starting the engine.

59. The system of claim 58 which also comprises a check valve in the idle circuit constructed and arranged to prevent reverse flow through the idle circuit when the purge pump is actuated.

60. The system of claim 22 which also comprises a manually actuated purge and primer pump carried by the body and communicating with the metering chamber for removing any fuel vapor and air from the metering chamber and ensuring the metering chamber is full of fuel preparatory to starting the engine.

61. The fuel system of claim 60 which also comprises a check valve in the crankcase fuel circuit which closes to prevent reverse flow through the crankcase fuel circuit when the primer and purge pump is actuated.

62. For a two-stroke spark ignited internal combustion engine having a cylinder, a piston received for reciprocation in the cylinder, a crankshaft driven to rotate by the piston, a crankcase communicating with the piston and in which the crankshaft is received, a primary air intake port communicating with the crankcase, a transfer passage communicating with the crankcase and having a transfer port communicating with the cylinder, an exhaust port communicating with the cylinder, and an intake port communicating directly with the cylinder, a fuel injection system comprising:

a tuned tube having a pair of ends, the tuned tube adjacent one end communicating with the cylinder intake port of the engine, and adjacent the other end communicating with the crankcase of the engine, a body, a primary air intake passage in the body having an inlet communicating with the atmosphere and an outlet constructed and arranged to communicate with the engine crankcase air intake port, a separate fuel injector passage in the body and having an inlet communicating with the atmosphere and an outlet constructed and arranged to communicate with the tuned tube adjacent its one end and upstream of the engine cylinder intake port, a fuel pump carried by the body and actuated by pressure variations produced by the operating engine to supply fuel to a fuel metering assembly, a fuel metering assembly having a fuel metering chamber receiving fuel from the fuel pump and in operation maintaining fuel in the metering chamber at a substantially constant pressure, a fuel circuit supplying fuel from the metering chamber to the fuel injector passage in operation to form a rich fuel and air mixture to be delivered to the turned tube and injected directly into the engine cylinder through the intake port, a first throttle valve in the primary air intake passage movable between substantially closed and wide open throttle positions to control in operation the flow of air through the primary air intake passage, a second throttle valve in the fuel injector passage and movable between substantially closed and wide open throttle positions to control the flow of air through the fuel injector passage, and an actuator connected with the first and second throttle valves to move them between their substantially closed and wide open throttle positions in operation to provide proportional air flow through the primary air intake and fuel injector passages so that under engine idle and wide open throttle operating conditions at least most of the total engine fuel requirement is supplied by a rich fuel and air mixture formed in the fuel injector passage and delivered by the tuned tube directly through the intake port to the engine cylinder and most of the engine air intake requirement is supplied through the primary air intake passage.

63. A two-stroke spark ignited internal combustion engine comprising a cylinder, a piston received for reciprocation in the cylinder, a crankshaft driven to rotate by the piston, a crankcase communicating with the piston and in which the crankshaft is received, a primary air intake port communicating with the crankcase, a transfer passage communicating with the crankcase and having a transfer port communicating with the cylinder, an exhaust port communicating with the cylinder, and an intake port communicating directly with the cylinder, and a fuel injection system comprising:

a tuned tube having a pair of ends, the tuned tube adjacent one end communicating with the cylinder intake port of the engine, and adjacent the other end communicating with the crankcase of the engine, a body, a primary air intake passage in the body having an inlet communicating with the atmosphere and an outlet communicating with an engine crankcase intake port, a separate fuel injector passage in the body and having an inlet communicating with the atmosphere and an outlet communicating with the tuned tube adjacent its one end and upstream of the engine cylinder intake port, a fuel pump carried by the body and actuated by pressure variations produced by the operating engine to supply fuel to a fuel metering assembly, a fuel metering assembly having a fuel metering chamber receiving fuel from the fuel pump and in operation maintaining fuel in the metering chamber at a substantially constant pressure, a fuel circuit supplying fuel from the metering chamber to the fuel injector passage in operation to form a rich fuel and air mixture to be injected by the tuned tube directly into the engine cylinder through the intake port, a first throttle valve in the primary air intake passage movable between substantially closed and wide open throttle positions to control in operation the flow of air through the primary air intake passage, a second throttle valve in the fuel injector passage and movable between substantially closed and wide open throttle positions to control the flow of air through the fuel injector passage, and an actuator connected with the first and second throttle valves to move them between their substantially closed and wide open throttle positions in operation to provide proportional air flow through the primary air intake and fuel injector passages so that under engine idle and wide open throttle operating conditions at least most of the total engine fuel requirement is supplied by a rich fuel and air mixture formed in the fuel injector passage and delivered by the tuned tube directly through the intake port to the engine cylinder and most of the engine air intake requirement is supplied through the primary air intake passage.

64. A charge-forming device for an internal combustion engine having an injector apparatus supplying at least a portion of the fuel requirements of the engine, said charge-forming device comprising:

a body, a primary air intake passage in the body having an inlet communicating with the atmosphere and an outlet constructed and arranged to communicate with an engine crankcase intake port, a fuel injector passage in the body having an inlet communicating with the atmosphere and an outlet constructed and arranged to communicate with an engine cylinder intake port, a fuel metering assembly having a fuel metering chamber receiving fuel from a fuel source and in operation maintaining fuel in the metering chamber at a substantially constant pressure, a fuel circuit supplying fuel from the metering chamber to the fuel injector passage in operation to form a rich fuel and air mixture to be delivered to the engine, a first throttle valve in the primary air intake passage movable between substantially closed and wide open throttle positions to control in operation the flow of air through the primary air intake passage, a second throttle valve in the fuel injector passage and movable between substantially closed and wide open throttle positions to control the flow of air through the fuel injector passage, and an actuator connected with the first and second throttle valves to move them between their substantially closed and wide open throttle positions in operation to provide proportional air flow through the primary air intake and fuel injector passages so that under engine idle and wide open throttle operating conditions at least most of the total engine fuel requirement is supplied by a rich fuel and air mixture formed in the fuel injector passage and delivered directly through the intake port to the engine cylinder and most of the engine air intake requirement is supplied through the primary air intake passage.

65. The device of claim 64 wherein the actuator is a linkage communicating with both the first and second throttle valves externally of the body.

66. The device of claim 64 wherein the actuator is a cam driven by the first throttle valve to slidably displace the second throttle valve in response to rotation of the first throttle valve.

67. The device of claim 64 which also comprises a nozzle in the fuel injector passage upstream of the second throttle valve and having an inlet section, a throat and an outlet section and wherein the fuel circuit communicates with the fuel injector passage downstream of the inlet section and upstream of the second throttle valve.

68. The device of claim 67 wherein the inlet, throat and outlet sections of the nozzle are formed by stepped bores in the body.

69. The device of claim 67 wherein the inlet, throat and outlet sections of the nozzle are formed by stepped bores formed in an insert carried by the body.

70. The device of claim 67 wherein the nozzle is venturi shaped.

71. The device of claim 64 which also comprises a plurality of small outlets of the metering chamber, all of the outlets leading to a common passage of the fuel circuit and being of a smaller diameter than downstream portions of the fuel circuit and being constructed to limit the size of fuel vapor bubbles which pass to said downstream portions of the fuel circuit.

72. The device of claim 64 which also comprises a block carried by the body and wherein the fuel injector passage is formed in the block.

* * * * *

UNITED STATES PATENT AND TRADEMARK OFFICE
CERTIFICATE OF CORRECTION

PATENT NO.    : 6,427,646 B2
DATED         : August 6, 2002
INVENTOR(S)   : William E. Galka et al.

It is certified that error appears in the above-identified patent and that said Letters Patent is hereby corrected as shown below:

<u>Column 16,</u>
Line 51, delete "150" and insert -- 15º --.
Line 67, delete "150" and insert -- 15º --.

<u>Column 19,</u>
Line 24, delete "turned tube" and insert -- tuned tube --.

Signed and Sealed this

Twenty-fourth Day of December, 2002

JAMES E. ROGAN
*Director of the United States Patent and Trademark Office*